UNITED STATES PATENT OFFICE.

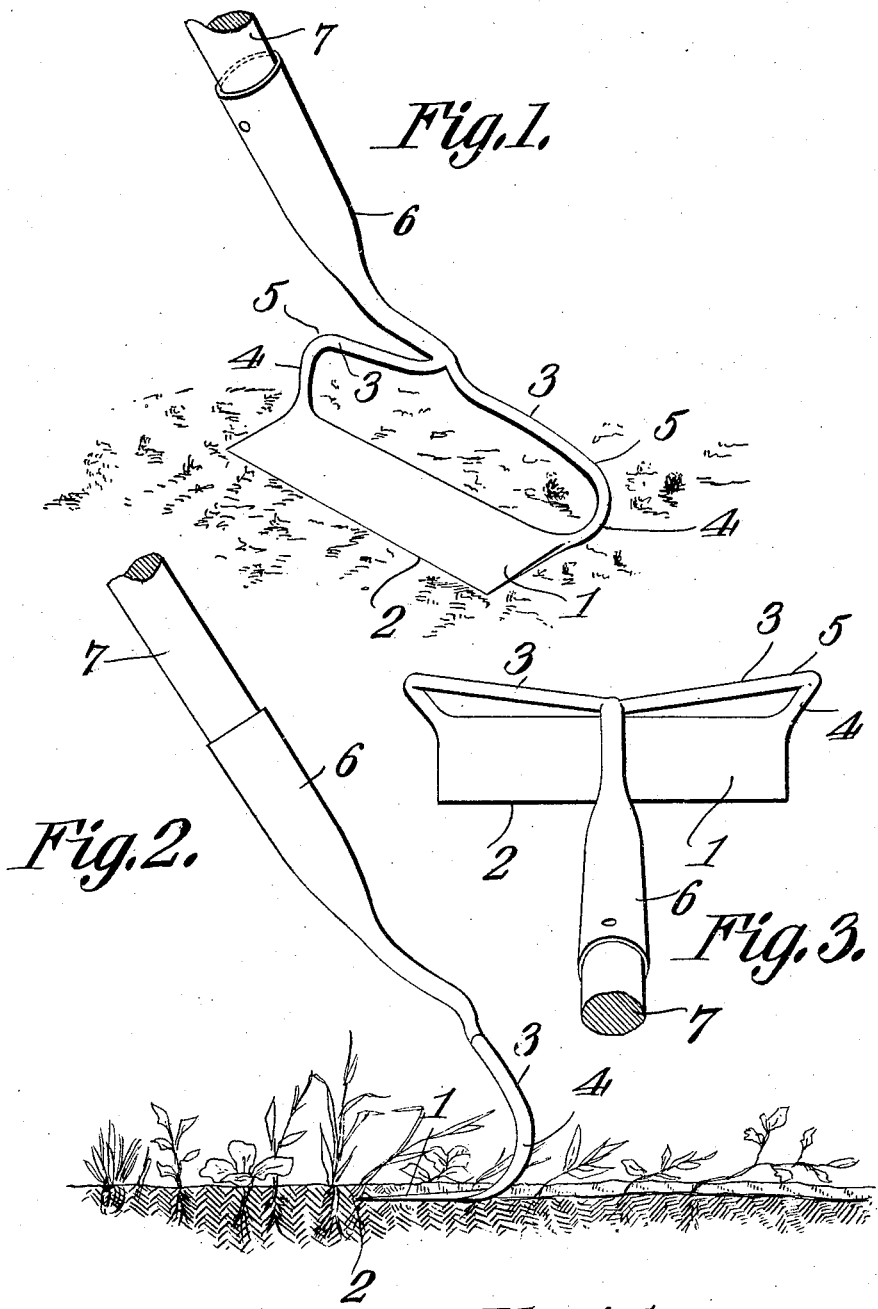

JOHN A. CRUMMER, OF GRANT TOWNSHIP, POCAHONTAS COUNTY, IOWA.

SURFACE-HOE.

No. 877,913.     Specification of Letters Patent.     Patented Feb. 4, 1908.

Application filed June 30, 1906. Serial No. 324,240.

*To all whom it may concern:*

Be it known that I, JOHN A. CRUMMER, a citizen of the United States, residing in Grant Township, in the county of Pocahontas and State of Iowa, have invented a new and useful Surface-Hoe, of which the following is a specification.

This invention has relation to surface hoes, and it consists in the novel construction and arrangement of their parts as hereinafter shown and described.

The object of the invention is to provide a hoe adapted to be used at the surface of the ground for cutting weeds and other vegetation and which is so constructed that it will cut lightly under the surface of the soil but does not to any appreciable degree drag or remove the soil; and at the same time the roots of the plant are cut and the plant itself is left upon the ground to wither and die.

The hoe is not intended to be used for chopping purposes, nor is it intended to be used for dragging or collecting the earth, and it may be so manipulated that it will not bunch or bundle the plants as they are cut, but leaves the same scattered over the surface of the ground exposed to the rays of the sun.

The hoe consists primarily of a blade which is very thin, and is long and narrow in a horizontal plane. Shanks of peculiar configuration connect the rear corners of said blade with a handle socket. The said blade is pitched at an angle of about 45 degrees to the handle. Consequently, the said blade may be moved substantially parallel with the surface of the earth without requiring bending over or stooping, on the part of the operator. It is by reason of the peculiar configuration of the shanks and the relative angles of inclination of the parts thereof to each other and to the line of draft of the hoe that the implement may be used to great advantage without dragging or bunching the vegetation as the same is cut.

In the accompanying drawing:—Figure 1 is a perspective view of the hoe. Fig. 2 is a side elevation of the same. Fig. 3 is a top plan view of the same.

The blade 1 is formed of a thin flat strip of metal having a longitudinal cutting edge 2. A socket 6 overhangs the blade and is designed to receive one end of a handle 7 and this socket has oppositely extending members 3 at one end thereof, the end portions of which are bent as shown at 5 to form bows 4 welded or otherwise connected to the rear corners of the blade 1. These bows 4 extend laterally beyond the ends of the blade so that plants cut by the end portions of the blade will be free to pass between the bows without being retarded thereby or becoming entangled therewith.

In operation, the blade 1 passes over the surface of the soil or slightly under the same when cutting under the soil; by inertia the blade slips under the soil and leaves the same remaining approximately at the same location. That is to say, the soil is not dragged or scraped. The roots of the vegetation are severed and the plants pass between the upper surface of the blade 1 and the peculiar bows 3 and remain substantially at the same location after being cut as that at which they were when rooted. In this way, the plants are not bundled or gathered but are left scattered out upon the surface of the ground exposed to the heat of the sun.

Having described my invention, what I claim as new and desire to secure by Letters Patent is:—

A hoe comprising a blade, a handle socket, and arms connected with the two corners of the blade and with the socket, the arms when the implement is viewed from its ends, being rearwardly and then forwardly bowed, and when viewed in plan being laterally projected on relatively sharp curves beyond the blade ends to provide an unobstructed passage for earth and the like, and angularly deflected toward the front edge of the blade to permit the implement to work close to a plant or the like.

In testimony that I claim the foregoing as my own, I have hereto affixed my signature in the presence of two witnesses.

JOHN A. CRUMMER.

Witnesses:
    J. O. BUSINGTON,
    CHAS. PATTEE.